United States Patent [19]
Uryu et al.

[11] Patent Number: 5,180,785
[45] Date of Patent: Jan. 19, 1993

[54] DIAPHRAGM AND METHOD FOR PRODUCING SAME

[75] Inventors: Masaru Uryu, Chiba; Kunihiko Tokura, Tokyo; Kyouji Muraoka, Yamaguchi, all of Japan

[73] Assignee: Sony Corporation, Tokyo, Japan

[21] Appl. No.: 601,391

[22] Filed: Oct. 23, 1990

[30] Foreign Application Priority Data

Oct. 23, 1989 [JP] Japan .................... 1-275721

[51] Int. Cl.⁵ ................ C08L 23/08; G10K 13/00
[52] U.S. Cl. ................ 525/240; 525/324; 181/169; 381/184; 381/202
[58] Field of Search ........... 525/324, 240; 381/184, 381/202; 526/352; 181/169

[56] References Cited

U.S. PATENT DOCUMENTS

| | | | |
|---|---|---|---|
| 4,786,687 | 11/1988 | Sano et al. | 525/240 |
| 4,792,588 | 12/1988 | Suga et al. | 526/352 |
| 5,022,084 | 6/1991 | Shinjo | 381/202 |

FOREIGN PATENT DOCUMENTS

| | | | |
|---|---|---|---|
| 182994 | 10/1983 | Japan | 181/169 |
| 148498 | 8/1984 | Japan | 181/169 |

Primary Examiner—Joseph L. Schofer
Assistant Examiner—Tom Weber
Attorney, Agent, or Firm—Hill, Van Santen, Steadman & Simpson

[57] ABSTRACT

A diaphragm formed of a material for molding mainly composed of a uniform mixture of an ultra-high molecular weight polyolefin with a high melting viscosity and a polyolefin with a lower melting viscosity, wherein the ultra-high molecular weight polyolefin is extensively oriented by the lubricating action of polyolefin having the lower melting viscosity and the method for producing the diaphragm. The diaphragm superior in specific modulus of elasticity and internal losses may be produced by producing the polyolefin composition by multi-stage polymerization and injection molding the composition for radially orienting the molecular chains of the ultra-high molecular weight polyolefin.

3 Claims, 1 Drawing Sheet

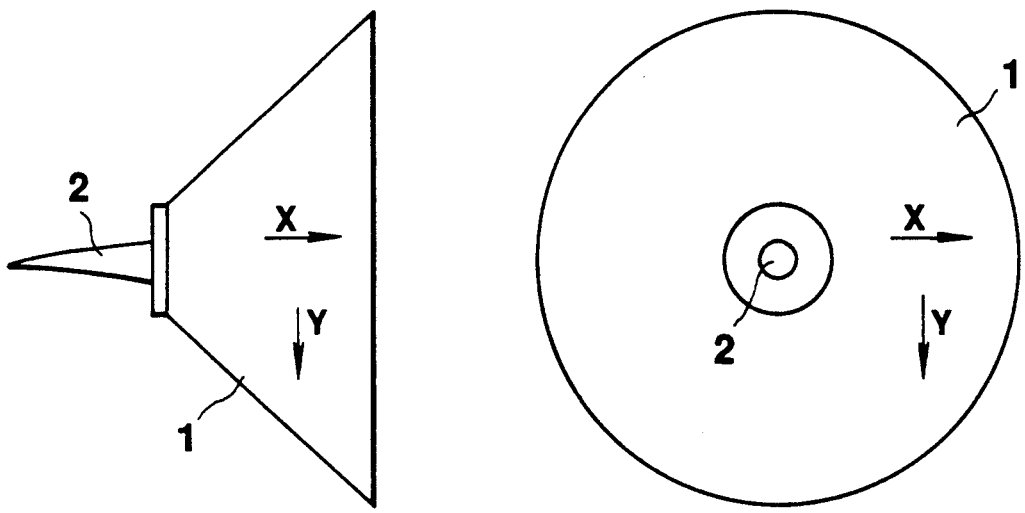
FIG.1(A)  FIG.1(B)
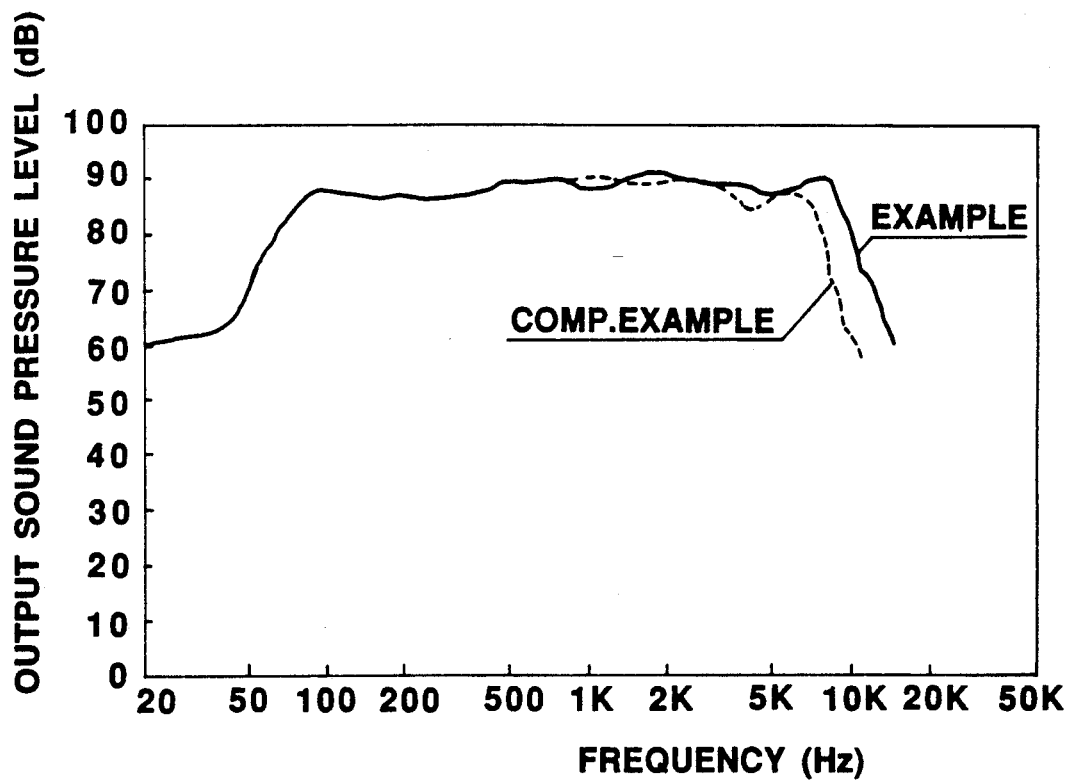
FIG.2

DIAPHRAGM AND METHOD FOR PRODUCING SAME

BACKGROUND OF THE INVENTION

1. Field of the Invention

This invention relates to a speaker diaphragm and a method for producing the same. More particularly, it relates to a diaphragm exhibiting a superior modulus of elasticity due to extensive orientation of the ultra-high molecular weight polyolefin, and a method for producing the same.

2. Description of the Prior Art

In a speaker diaphragm, a demand for a high specific modulus of elasticity E/P, where E is a modulus of elasticity and p the density is raised to enhance the range of piston movement ,while a demand is similarly raised for larger internal losses for smoothing frequency characteristics in the high sound range.

Until now, a method of mixing carbon fibers into the diaphragm material, mainly composed of paper pulp, for example, or a method of mixing a material of a higher modulus of elasticity, such as carbon fibers or mica, into the high molecular weight material, has been practiced as means for increasing the specific modulus of elasticity. On the other hand, the internal losses may be improved by applying an organic paint showing large internal losses, known as a dumping agent, to the surface of the diaphragm, or impregnating the diaphragm with such paint.

With the former method by mixing carbon fibers into paper pulp, it is difficult to achieve a high specific modulus of elasticity due to limitations imposed on the amount of the carbon fibers, whereas, with the method by mixing the material of the high specific modulus of elasticity into the high molecular weight material, the specific modulus of elasticity cannot be increased sufficiently because of increased melting viscosity at the time of molding and resulting limitations on molding. With the latter method, coating or impregnation of the dumping agent for improving the internal losses results in the lowered specific modulus of elasticity.

With this in view, erseaches and development of diaphragm materials having a high specific modulus of elasticity and large internal losses, such as ultra high molecualr weight polyolefin, are progressing.

Meanwhile, for realizing the high specific modulus of elasticity and large internal losses of the above mentioned ultra high molecular weight polyolefin, it is essential that the molecular chains of polyolefin be aligned in one direction. Thus the general practice has been to use fibers previously stretched by a gel stretching method as the diaphragm material.

For example, the Japanese Patent Publication No. JP.A58-182994(1983) dislcoses a technique of forming ultra high molecular weight polystyrene fibers with the propagation velocity of the longitudinal waves of not less than 4000 m/sec into a sheet by a wet paper making technique, drying and pressing the sheet by air under pressure to produce a speaker diaphragm.

However, with the diaphragm produced by the above mentioned paper making technique, since the fibers are oriented at random, the specific modulus of elasticity is markedly lowered as compared to the specific modulus of elasticity proper to the fibers.

On the other hand, the polyolefin fibers are difficult to mold on account of their inactivated surfaces, while the use of the binder has practically no effect in improving moldability of the polyolefin fibers.

OBJECT AND SUMMARY OF THE INVENTION

It is therefore an object of the present invention to provide a new technique for extensive orientation of the molecular chains of the ultra high molecular weight polyolefin.

It is another object of the present inventin to provide a method for producing a diaphragm superior in specific modulus of elasticity and internal losses by applicatin of a conventional molding technique.

As a result of our prolonged researches towards accomplishing the above object, the present inventors have found that, by taking advantage of the difference in fluidity in the components of the polyolefin composition produced by multi-stage polymerization, the molecular chains of the ultra high molecular weight polyolefin may be extensively oriented as a result of injection molding.

The present invention has been fulfilled on the basis of the above finding and is characterized by producing a molding material formed essentially of a polyolefin composition by a multi-stage polymerization method from an ultra-high molecular weight polyolefin having a limiting viscosity as measured in a Decaline solution of 135° C. of 10 to 40 dl/g and a low to high molecular weight polyolefin having a limiting viscosity as measured in a Decalin solution of 135° C. of 0.1 to 5 dl/g, and injection molding said ultra-high molecular weight polyolefin for radially orienting said ultra-high molecular weight polyolefin. In this manner, a diaphragm may be produced which is superior both in specific modulus of elasticity and internal losses.

According to the present invention, the ultra high molecular weight polyolefin with a high melting viscosity and the low to high molecular weight polyolefin with a low melting viscosity are polymerized by multi-stage polymerization to produce a polyolefin composition, which is then injection molded so as to take advantage of the difference in fluidity between the two components to realize radial orientation of the molecular chains of polyolefin. In this manner, the diaphragm may be produced which is superior is both specific modulus of elasticity and internal losses.

The diaphragm may be moded by application of the well-known injection molding, which is advantageous from the viewpoint of productivity.

BRIEF DESCRIPTION OF THE DRAWINGS

FIGS. 1A and 1B are a side elevational view and a front view, respectively, showing a mold employed for molding the diaphragm.

FIG. 2 is a chart showing sound pressure frequency characteristics of a full-range speaker formed of the polyolefin compositin and a speaker formed of ordinary polypropylene.

DETAILED DESCRIPTION OF THE INVENTION

It is known that, if the molecular chain of an organic high polymer material is oriented in one direction, physical properties of the material, such as modulus of elasticity or tensile strength, may be improved significantly. As an example, if polyethylene as a general-purpose high polymer material is oriented to a higher degree, its theoretical modulus of elasticity may be computed to be 250 GPa. As a matter of fact, fibers having the modulus of elasticity of 200 GPa have been produced on the laboratory level by a technique such as gel elongation, while fibers having the modulus of elasticity in the order of 90 to 100 GPa have been presented to the market. Therefore, molecular chain orientation is an effective means for improving the modulus of elasticity to meet the demand raised in connection with a speaker diaphragm.

According to the present invention, a polyolefin composition obtained by multi-stage polymerization of an ultra high molecular weight polyolefin with a high melting viscosity and a low to high molecular weight polyolefin with a low melting viscosity is used and the molecular chains of the ultra high molecular weight polyolefin are oriented radially by means of injection molding taking advantage of the differential fluidity between these two components to improve the modulus of elasticity of the composition.

It is critical that the two components of the polyolefin compositin having markedly different melting viscosity be mixed uniformly together. If the polyolefin composition obtained by multi-stage polymerization is melted and fluidized, the low viscosity component acts as the inner lubricant to stretch the high viscosity component, that is the ultra high molecular weight polyolefin, in the direction of increasing fluidization, to realize extensive orientation of the molecular chains.

Conversely, if only the ultra high molecular weight polyolefin and low to high molecular weight polyolefin are simply mixed together and ther sulting mixture is injection molded, the high viscosity component is not dispersed minutely, although some extent of orientation is realized, and hence the molded product is subject to, for example, laminar exfoliation, such that optimum characteristics are not obtained.

It is critical in the present invention that the olefinic composition, employed as the molding material, be a homopolymer or a copolymer of α-olefins, such asd ethylene, propylene, 1-butene, 1-pentene, 1-hexene, 1-octene, 1-decene, 1-dodecene, 4-methyl-1-pentene or 3-methyl-1-pentene, and that the two components exhibiting markedly different melting viscosities be mixed uniformly together.

That is, the composition is a homogeneous mixture of an ultra high molecular weight polyolefin having a limiting viscosity of 10 to 40 dl/g and a low to high molecular weight polyolefin having a limiting viscosity of 0.1 to 5 dl/g.

Such olefin compound has been know per se and the method for producing the same is shown for example in the Japanese Patent Publication No. JP.A01-144533(1989). More specifically, it may be produced by a method of multi-stage polymerization of an olefin or olefins in the presence of a catalyst consisting essentially of a certain high-activity solid titanium catalyst component and an organoaluminium compound catalyst.

The multi-stage polymerization is performed by carrying out the process of olefin polymerization in plural stages in the presence of a Zegler type catalyst constituted by a high active titanium catalyst component (a) consisting essentially of magnesium, titanium and halogens and an organoaluminum component (b). The ultra high molecular weight polyolefin having a limiting viscosity of 10 to 40 dl/g is produced in at least one polymerization process adn the olefin is polymerized in another polymerization process in the presence of hydrogen to produce the low to high molecular weight polyolefin having a limiting viscosity of 0.1 to 5 dl/g.

Hence, a multi-stage polymerization apparatus comprised of at least two series connected polymerization tanks is used for polymerization, with the number of polymerization being 2 to n, n being an optional integer. Alternatively, the multi-stage polymerization may be carried out by batch polymerization using a single polymerization tank.

In the above mentioned multi-stage polymerization, the polymerization reaction of producing the ultra-high molecular weight polyolefin or of producing the low to high molecular weight polyolefin may be practiced by a gas-phase polymerization or a liquid-phase polymerization. In either case, the polymerization reaction of producing the polyolefin is carried out in the presence of an inert imedium, such as aliphatic, alicyclic, aromatic or halogenated hydrocarbons, as the occasion may require. For producing the ultra high molecualr weight polyolefin during the polymerization process, the polymerization reaction is preferably carried out in the absence of hydrogen. On the other hand, in the polymerization process other than the process of producing the ultra-high molecular weight polyolefin as described above, the polymerization reaction for the remaining olefins is carried out in the presence of hydrogen.

The so-produced polyolefin composition is used as the molding material and injection molded under customary injection molding conditions to produce a diaphragm. It is preferred that the molding material be injected at the center of the mold to permit the melted molding material to flow radially within the mold.

The molding material, consisting essentially of the above mentioned polyolefin composition, may additionally contain mica, glass fibers or the like fillers. From the aspect to fluidity, the filler content is preferably about 40 wt. % at the maximum.

The present invention will be explained in detail with reference to concrete experimental results.

EXAMPLE 1

Composition

A polyethylene composition was prepared by a two-stage polymerization of polymerizing ethylene in two stages in the presence of a catalyst consisting essentially of a high-active solid titanium component and an organoaluminium compound component.
limiting viscosity (Decalin, measured at 135° C.)
 ultra-high molecular weight
 polyethylene, 30 dl/g
 low-to-high molecular weight
 polyethylene, 0.7 dl/g
 composition, 8.1 dl/g
amounts of the components
 ultra-high molecular weight
 polyethylene, 25 wt. %
 low-to-high molecular weight
 polyethylene, 75 wt. %

Injection Molding

Using an injection molding apparatus (IS-55 mfd. by Toshiba Kikai Co. Ltd.), the above mentioned polyethylene composition was injection molded into a conical mold 1 shown in FIG. 1A and 1B by means of a central nozzle 2 to produce a 16 cm cone-shaped full-range speaker under the following injection molding conditions:
Cylinder Temperature; 200° to 270° C.
Injection Pressure; 1st/2nd=1800/800

Mold Temperature; 32° C.(water cooling).

A portion of the produced molded product (Example 1) was cut out and its physical properties such as modulus of elasticity and internal losses were measured by the vibration reed method to appraise the properties as the speaker diaphragm. Measurement was performed in the X-direction in FIGS. 1A and 1B, that is the radial direction with the nozzle of the injection molding as the center, and in the Y-direction, that is the direction orthogonal to the X-direction. The items of appraisal were the internal losses tan δ, Young's modulus ε, density and the speed of propagation of the longitudinal waves C. For comparison, similar appraisal was made of the molded products formed of usual polypropylene (comparative example). The results are shown in Table 1.

TABLE 1

|  | direction | tan δ | ε (GPa) | (kg/m³) | C (m/sec) |
| --- | --- | --- | --- | --- | --- |
| Ex. 1 | X | 0.041 | 7.78 | 971 | 2831 |
|  | Y | 0.053 | 2.21 | 971 | 1510 |
| Comp. Ex | X | 0.065 | 2.29 | 901 | 1594 |
|  | Y | 0.071 | 1.89 | 901 | 1448 |

It may be seen from Example 1 that the molecular chains are oriented in the direction of driving the speaker diaphragm, that is, in the X-direction, with resulting improved modulus of elasticity.

Conversely, in the comparative example employing usual polypropylene, although some orientation occurred, the effect of orientation could hardly be noticed.

It is noted that the properties of the non-oriented polyethylene composition employed in Example 1 were substantially similar to those of Example 1 as measured in the Y-direction.

The sound pressure frequency characteristics of the produced speaker diaphragm were measured for comparison between the example and the comparative example. The results are shown in FIG. 2.

It is seen from these results that the playback frequency region of the speaker diaphragm formed of the above described polyethylene composition has been enlarged, which is thought to be attributable to the improved modulus of elasticity brought about by orientation. It is also seen from Example 1 that smooth frequency characteristics in the high frequency region have been achieved despite increased modulus of elasticity, thus indicating that proper internal losses are maintained.

EXAMPLE 2

In the present example, an appraisal was made of the composition admixed with the filter.

The polyethylene compositin was prepared in the same way as in Example 1 and admixed with 15 wt. % of chopped strands of carbon fibers each 6 mm in length. The resulting mixture was injection molded in the same way as in Example 1. A portion thereof was cut and its physical properties were measured by the vibration reed method in the same wasy as in Example 1 to appraise its properties as the speaker diaphragm. The results are shown in Table 2.

TABLE 2

|  | direction | tan δ | ε (GPa) | (kg/m³) | C (m/sec) |
| --- | --- | --- | --- | --- | --- |
| Ex. 2 | X | 0.021 | 13.43 | 1054 | 3570 |
|  | Y | 0.032 | 3.45 | 1054 | 1810 |

It is seen from these results that, in addition to the effects of orientation, noticed in Example 1, the carbon fibers are also oriented, with the result that the modulus of elasticity in the X-direction may be improved significantly.

What is claimed is:

1. A speaker diaphragm with an improved modulus of elasticity formed essentially of a polyolefin composition produced by a multi-stage polymerization method from an ultra-high molecular weight polyolefin having a limiting viscosity as measured in a Decalin solition of 135° C. of 10 to 40 dl/g and a low to high molecular weight polyolefin having a limiting viscosity as measured in a Decalin solution of 135° C. of 0.1 to 5 dl/g, said ultra-high molecular weight polyolefin having its molecular chain oriented in the radial direction of said diaphragm.

2. The diaphragm according to claim 1, in which the radial orientation of said molecular chain is achieved by mixing said polyolefin components uniformly together and forming said diaphragm by injection molding, whereby the differential fluidity of said polyolefin components results in said orientation.

3. A speaker diaphragm having an improved high frequency characteristic formed essentially of polyolefin composition produced by a multi-stage polymerization method from an ultra-high molecular weight polyolefin having a limiting viscosity as measured in a Decalin solution of 125° C. of 10 to 40 dl/g and a low to high molecular weight polyolefin having a limiting viscosity as measured in a Decalin solution of 135° C. of 0.1 to 5 dl/g, said ultra-high molecular weight polyolefin having its molecular chain oriented in a radial direction of said diaphragm, said improved high frequency characteristic comprising an output-frequency characteristic which is extended at the high frequency end with a smooth characteristic in the high frequency region of said characteristic.

* * * * *